United States Patent [19]
Hamilton et al.

[11] 3,857,687
[45] Dec. 31, 1974

[54] CENTRIFUGAL FILTER

[76] Inventors: Earle M. Hamilton, 12 S. Parkway Rd., Monmouth, N.J. 06413; William Cook, Rt. No. 1, Westbrook, Conn. 06498

[22] Filed: Oct. 9, 1973

[21] Appl. No.: 404,268

[52] U.S. Cl. ............... 55/337, 55/407, 55/DIG. 25
[51] Int. Cl. ............................................ B01d 50/00
[58] Field of Search ........................... 55/400–408, 55/DIG. 25, 337, 486, 323

[56] References Cited
UNITED STATES PATENTS

| | | |
|---|---|---|
| 3,289,397 | 12/1966 | Schonewald et al. ............. 55/400 X |
| 3,308,610 | 3/1967 | Springer et al. ....................... 55/471 |
| 3,763,631 | 10/1973 | Horn et al. ......................... 55/400 X |
| 3,800,514 | 4/1974 | Avondoglio et al. ............. 55/400 X |

Primary Examiner—Frank W. Lutter
Assistant Examiner—William Cuchlinski, Jr.
Attorney, Agent, or Firm—Denson and Kurtzman

[57] ABSTRACT

A centrifugal filter comprising a perforated rotatable drum and a housing for said drum. The walls of the housing curve gently inward toward the airstream such that droplets collected on the walls of the housing are maintained against the walls and carried toward a slot whereby droplets are skimmed off from the filtered air stream.

9 Claims, 3 Drawing Figures

CENTRIFUGAL FILTER

BACKGROUND OF THE INVENTION

1. Field of the Invention

This invention relates to devices for filtering aerosols from a gaseous stream. The invention more particularly relates to an improved devices for filtering aerosols from a gaseous stream, and more specifically to improvements in centrifugal filters.

2. Brief Description of the Prior Art

Society has become extremely conscious of and concerned with the pollutants in air. It is therefore often necessary for industry to clean the air polluted during industrial processes prior to circulating the air into the general atmosphere.

An aerosol is a suspension of colloidal particles in a gas. The minute particles can be either liquids or solids such as fog, smoke, pollen and dust particles. During industrial processes, it is necessary that the aerosol be rapidly removed and such rapid removal can be accomplished through precipitation processes which will cause the aerosol to agglomerate or coalesce. A means of causing rapid agglomeration or coalescense is to subject a gaseous stream comprising aerosol to a centrifugal field.

Prior art centrifugal filters suffer from a number of problems which can prevent a thorough and efficient separation of aerosols from the gaseous stream. The prior art devices do not provide for means of reducing "carry-over," i.e., re-entrained particles which have agglomerated or coalesced, and at the exit therefore, although air may be free of aerosol, the air may contain large drops or particles such as for example, large oil drops. Some prior art centrifugal units require thick filtering media thereby requiring excessive amounts of energy to maintain an efficient air flow. The prior art centrifugal filtering units also have wide running clearances within the units which promotes recirculation of the air thereby greatly reducing the efficiency of the units. Additionally, the prior art units are extremely difficult to clean, requiring complete disassembly of the units in order to remove the filter media. A significant disadvantage with respect to the prior art units is the restrictiveness regarding the orientation of the units. The units must be maintained in only that orientation which will allow for the gravity flow of the agglomerated particles or liquid, and in connection therewith would require expansion of the air so as to produce an adequate pressure drop in air flow in order to permit gravity to efficiently cause particle drop out. The filter apparatus of the present invention overcomes these difficulties and disadvantages as well as other difficulties and disadvantages that will become clear from a reading of the specification.

SUMMARY OF THE INVENTION

In accordance with the invention, there is provided a centrifugal filter for removing aerosol particles from a gaseous stream, said filter comprising a rotatable drum having a plurality of circumferentially disposed perforations, the drum has inlet means. Surrounding the drum is a housing with inlet means and outlet means. The cylindrical portion of the housing curves inward toward the downstream end, i.e., into the air stream whereby droplets collected onto the housing wall are maintained against the wall by the action of the air velocity. Immediately adjacent the rear end of the housing is an exhaust chamber for collection of filtered air. The inlet means of the exhaust chamber corresponds to the outlet means for the housing, said means being screened so as to collect any droplets which may be re-entrained into the air stream. Projecting from the exhaust chamber toward the end of the cylindrical wall of the housing so as to be in close communication with the end of the housing is an annular lip portion thereby forming a circumferential slot along the periphery of the downstream end of the housing. The slot is in direct communication with a collection chamber having outlet means and venting means, said chamber being disposed about the end portion of the housing whereby agglomerated aerosol collected on the wall of the housing is skimmed off through the slot into the collection chamber.

OBJECT OF THE INVENTION

It is therefore an object of this invention to provide an improved aerosol filter system for the rapid and efficient agglomeration of solid particles and coalescence of liquid droplets.

It is another object of this invention to provide an improved centrifugal filter for removing aerosols from a gaseous stream moving through the filter system.

A further object of this invention is to provide a filter system wherein the rotatable drum is mounted directly to the motor thereby eliminating additional supports.

It is yet another object of this invention to provide a centrifugal aerosol filter with improved volumetric efficiency.

It is still another object of this invention to provide a filter system which has reduced recirculation of the gaseous flow streams and improved efficiency.

Yet another object of this invention is to provide a filter system which provides for the filtering of reentrained coalesced liquid and other particles.

Still another object of this invention is to provide a centrifugal filter for gaseous streams containing aerosols, which is relatively simple to clean.

It is yet another object of this invention to provide a centrifugal filter which may be oriented in several positions, including vertical as well as horizontal positions.

It is a particular object of this invention to provide a centrifugal filter for air steams containing aerosols which system does not rely upon gravity flow for the collection of agglomerated or coalesced materials.

These objects as well as other object features and attendant advantages will become apparent from a perusal of the specification that follows together with the accompanying drawings.

DETAILED DESCRIPTION OF THE DRAWINGS

Figure 1:
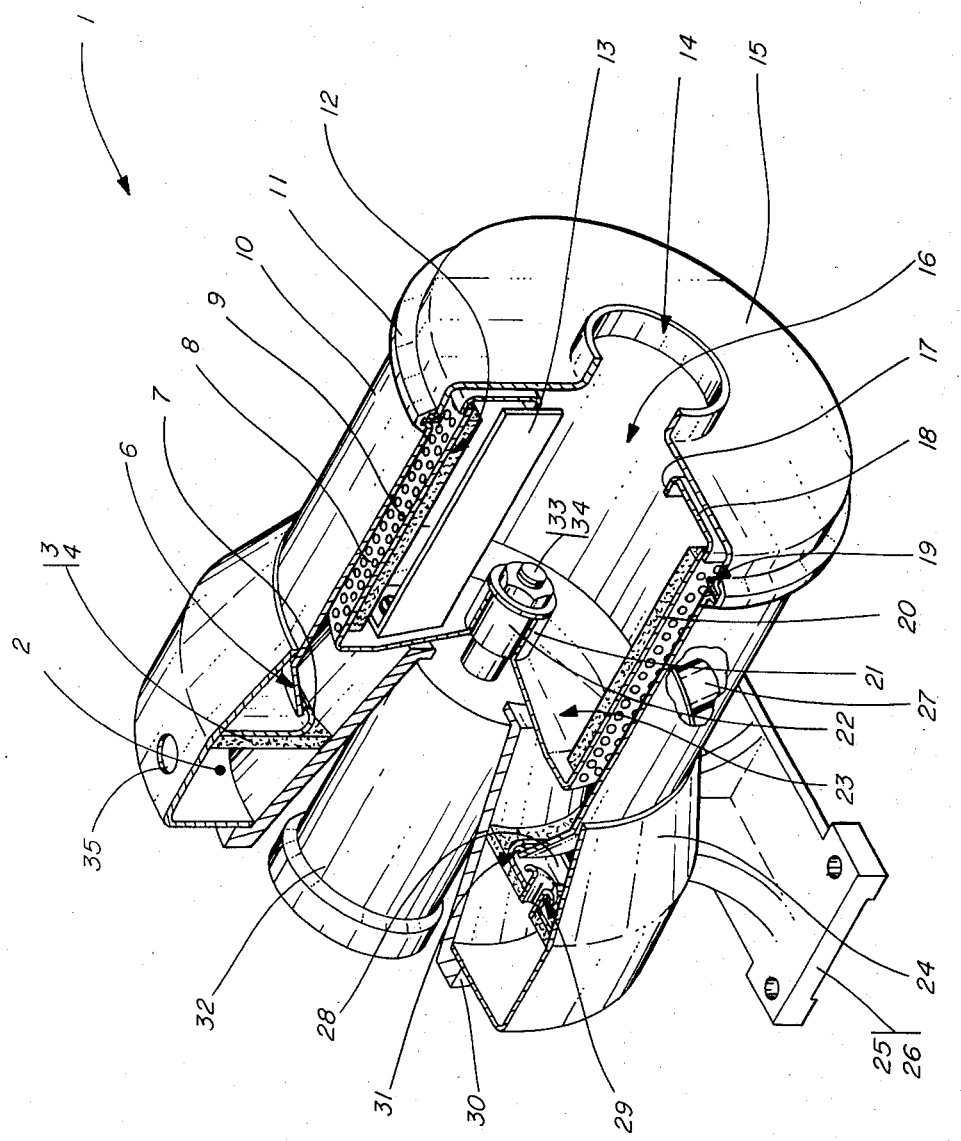
FIG. 1 is a pictorial cutaway illustrating one form of the improved device.

Reference is now made to the drawings wherein like reference numerals are used to identify the same parts appearing in the several views. There is illustrated a centrifugal filter having a rotatable drum 8 with closely spaced perforations 9 throughout the drum circumference which drum has a downstream end in the shape of a truncated cone 23. The cone is inwardly flanged toward its inner diameter thereby forming a sleeve 21 which is suitably connected to a longitudinally extending shaft 22 which extends rearward to a centrally located electric motor contained in motor housing 32. A washer 33 and nut 34 or other suitable retaining means is attached at the end of the shaft. In accordance with a preferred embodiment of the invention, a series of integral impeller blades 13 are evenly longitudinally spaced about in the inner circumferential surface of the drum in order to improve the volumetric efficiency and augment the agglomeration or coalescence of the aerosol carried in a gaseous stream. The impeller blades may be suitably fastened by angle flanges (not shown) or by other obvious means and the blades extend longitudinally from the front end to the rear end of the drum. The blades can stop short of the internal diameter of the drum in order to allow any filter media employed to be assembled in one piece. The blades, in addition to augmenting agglomeration and increasing volumetric efficiency of the airflow, act as supports for any filter media employed. In an embodiment of this invention therefore, the inner circumference 12 of the drum can be lined with a porous membrane 20 or other suitable filtering means.

A frontward located inlet 16 for an aerosol containing gaseous stream is of lesser inner diameter than the drum inner diameter. The drum inlet is formed by an annular deep lip 18 extending inward from and transverse to the drum circumference and is flanged inward at its periphery to form a lesser lip 17.

The drum is contained in a cylindrical housing 10, the longitudinal axis of the housing coaxil with the longitudinal drum axis. The housing has an inlet duct 14 for a gaseous stream and outlet 3 suitably containing a secondary screen and static filter 4 for capture of particles re-entrained in the air stream. Duct 14 is coaxil with inlet 16. The cylindrical walls at the downstream portion 6 gently curve inward so as to come in close proximity to an annular lip 7 having a semi-circular cross-section, said annular lip extending inward from the rear wall 5 of the housing and suitably attached thereto. A cover 15 is detachably fixed to the circumferential walls of the housing and held in place by a circumferential retaining clamp 11 having a V-shaped cross-section or by any other suitable means for maintaining the front end in position. A suitable seal or gasket 19 is clamped between housing 10 and cover 15 by retaining clamp 11. The annular lip, together with the end of the inward curving wall, form a circumferential slot 31 which is the inlet to a circumferential collection chamber 28 disposed about the end portion of the housing. An outlet duct 27 extends from the collection chamber as a means for egress of filtered aggregates and liquids and the like. Suitably disposed about the collection chamber are one or more vents 29 having a reverse flare at the inlet end which stand clear of the inside walls of the chamber for prevention of pressure build-up within the said chamber. The vents are in communication with and connect to an exhaust chamber 2 where the clean air is exhausted through the screened outlet 4.

Extending from the walls of the exhaust chamber and converging to the walls of the housing are suitably attached walls 24 forming the outer wall of the collection chamber. The exhaust chamber has an air outlet 35 for clean air. Suitably disposed in close proximity to the exhaust chamber and rear housing wall is the motor housing mount 30 for the electric motor. The entire system is suitably attached by nuts 26 or other attaching means to a supporting foot or base 25.

Operation of the device is substantially as follows: the gaseous stream containing the aerosol is introduced by suction action of the rotating drum through inlet duct 14, thereafter through inlet 16, and thereupon into the spaced defined by the walls of the drum. As the gaseous flow passes into the rotating drum, centrifugal acceleration forces the airflow outward in a spiralling motion. As the suspended particles pass through the closely spaced perforations, the crowding action causes the particles to merge or coalesce and form larger droplets. Because of their increased mass, they are thrown by centrifugal forces against the wall of the cylindrical housing. The large droplets adhere to the wall, form rivulets and are conveyed by the airstream to the circumferential slot 31 into the collection chamber where the collected liquid then passes through the outlet duct for collection and disposal. Re-entrainment of the droplets while on the housing wall is prevented by the inward curvature of the wall. The effect of having the wall gently curve into the airstream is that the air velocity forces and pushes the merged drops against the walls until they are skimmed off by the slot. Opposite curvature would cause the separated droplets to become airborne and once again suspended into the airstream. Because the separated droplets are moved along by the airstream, collection of the droplets does not depend on gravity and hence the system can be orientated in any direction. The freedom of orientation leads to greater efficiency and leeway in plant design as well as other obvious benefits.

The inlet area of the slot should be maintained as small as possible in order that only an extremely small amount of the air will pass through the slot into the collection chamber with the filtered and coalesced aggregates or liquid. If excessive air enters the chamber, a back pressure can develop and counter airflow will issue from the slot and thereby prevent full liquid collection. However, since the area of the outlet duct is smaller than the slot area, one or more vents 29 are provided in the collection chamber in order to prevent any excess build-up of back pressure. The excess air passing through the slot is thereby vented through vents 29 into the exhaust chamber 2 and combines with the filtered and clean air which has passed through the secondary filter 4. In a preferred embodiment of the invention, the slot gap is about 1/16 of an inch.

It is important, in order to prevent liquid from passing through the vents, to have the vents stand clear of the insides of the walls of the collection chamber. Liquid is further restrained from entering the vents by the presence of the reverse flare on the vent inlet. With the vents so standing clear, only substantially clean air will be vented.

The presence of the secondary filter or screen 4 which is located beyond the slot entrance across the back of the housing is desirable in order to slow down any coalesced droplets that may escape the slot. The droplets as they pass into the exhaust chamber will settle to the bottom. From time to time, the small amounts of collected liquid in the exhaust chamber may be drained off in any suitable manner.

As noted above, the drum can be employed without a filter lining. In those instances, however, where the air is carrying micron and sub-micron particles, the drum is preferably lined with a screen or porous membrane. The screen or porous membrane will absorb and retain the smaller particles until they grow large enough in mass to be discharged through the screen and through the drum perforation. A double filter or screen system is highly desirable, the innermost being thin as compared to the screen lining the drum thereby facilitating ease of removal without affecting the balance of the drum. The filter or screen materials can be paper, stainless steel meshes, polyester filters and the like. The choice of material depends on the particular needs and applications. A significant advantage of the instant system is the ease of entering into the machine in order to change filters, clean filter, etc. The front end of the housing, for example, is simply removed by removing the retaining clamp. With the front so removed, access to the inside of the system is a simple matter.

The deep inner lips 17 and 18 of the drum is advantageous for several reasons. When the internal auxiliary impeller is employed in combination with a high resistance filter, the airflow is prevented from spilling out of the drum and following a route outside the drum. Prevention of spill-out is necessary in order to obtain efficient filtering action. Secondly, the lip is ideally suited for the placements of weights in order to provide an accurate balance during the rotation and so prevent excessive wear on the system.

Figure 2:
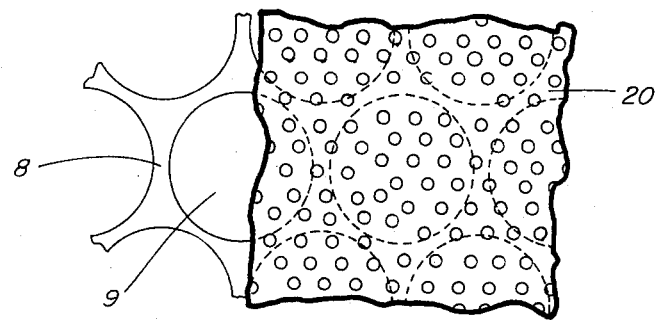
FIG. 2 is an enlarged fragmentary plan view of the perforated drum lined with a filtering media.
Figure 3:
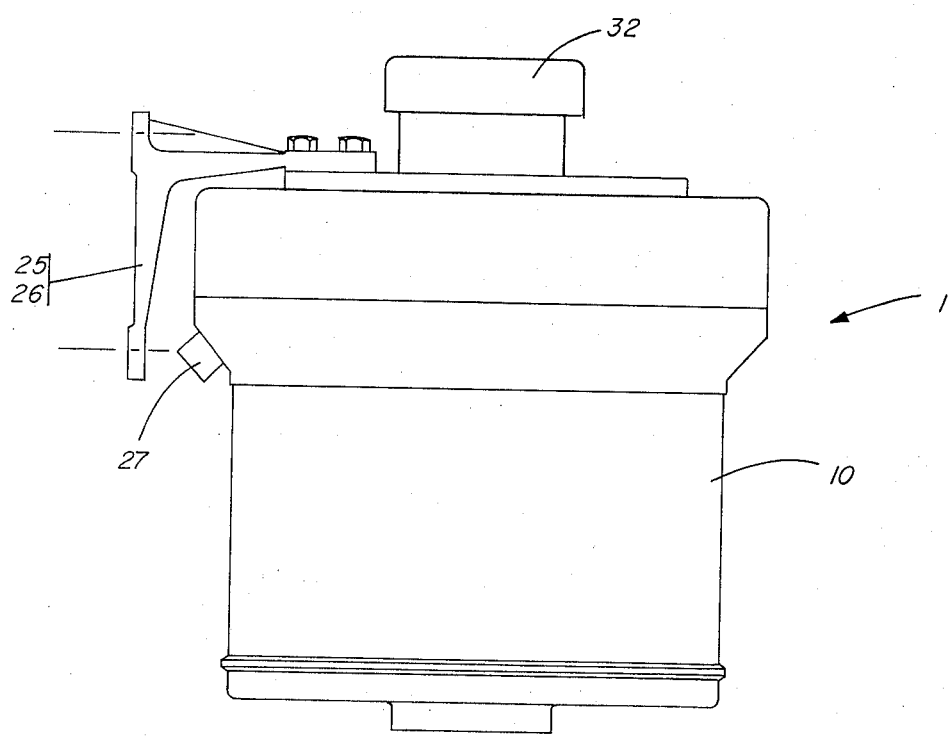
FIG. 3 is an orthographic view showing an alternate mounting position.

The supporting foot is designed in a manner such that it can be assembled in any of four positions 90° apart. The design permits floor and ceiling mounting as well as right or left hand wall mounting. Additionally, the system can be suspended from the ceiling (FIG. 2), so that the axis of rotation is vertical, by any suitable means, such as for example, tie bars.

Although in a preferred embodiment, the system is driven by the motor as illustrated in the accompanying drawing, it is obvious that the device can be driven by other means such as for example, a hydraulic motor, a jack shaft, belts, gears and the like.

In those instances where smoke or other such fine particles are in the gaseous stream, the exhaust chamber is suitably adaptable for the installation of an electrostatic precipitator. Hence, the heavier mist is removed through the action of the rotating drum and the associated items embodied in this invention as described above, and the smoke is collected by the electrostatic precipitator.

The filter unit is readily employed in filtration of all types of aerosols such as oil, smoke, pollen, fog and the like. While a particular and preferred embodiments of the invention has been described, it is obvious that various modifications of the structure involved may be made which would be within the scope of the invention by those having ordinary skill in the art upon a reading of the instant specification.

The invention has been described in detail with particular reference to certain preferred embodiments thereof, but it will be understood that variations and modifications can be effected within the spirit and scope of the invention.

We claim:

1. A filter for removing aerosol particles from a gaseous stream, comprising a rotatable drum having a plurality of circumferentially disposed perforations, a first circular base portion and a second circular base portion with inlet means, means for rotating the drum, a housing for said drum having a cylindrical wall portion, the cylindrical portion curving inward toward the downstream end, a first circular end portion with inlet means for the gaseous stream concentric with said drum inlet means, the longitudinal axis of said housing being coaxial with the longitudinal drum axis, an exhaust chamber having outlet means for the gaseous stream and inlet means for filtered gaseous stream comprising a filtering means, the inlet means corresponding to the outlet means for the housing, an annular lip portion extending from the inner wall of the exhaust chamber toward the end of the cylindrical wall of said housing so as to form a circumferential slot along the periphery of the downstream housing end and a collection chamber in communication with said slot, said collection chamber disposed about a portion of the housing and having an outlet drain for collected filtered aggregates, venting means communicating with the exhaust chamber said venting means extending into the collection chamber, whereby aerosol particles entering into the drum are subjected to centrifugal forces and while passing through the perforations grow in size, are deposited on the cylindrical housing walls, skimmed off through the slot to the collection chamber for collection.

2. A filter for removing aerosol particles from a gaseous stream comprising:
   a. A cylindrical housing with inlet and screened outlet means for the gaseous stream, the cylindrical wall portion curving inward toward the downstream end;
   b. An exhaust chamber adjacent to the downstream end of the housing for collecting filtered air, said chamber having outlet means and inlet means, said inlet corresponding to the housing outlet means;
   c. An annular lip portion extending from the inner wall of the exhaust chamber toward the end of the cylindrical wall of the housing thereby forming a circumferential slot along the periphery of the housing, said slot being an inlet means for aggregates collected on the walls of the housing to a collection chamber circumferential of the housing;
   d. The collection chamber having an outlet drain for collected filtered aggregates and venting means in communication with the exhaust chamber for reducing back pressure developed in the collection chamber, said venting means extending into the collection chamber and having a reverse flare at the inlet end;
   e. A perforated rotatable drum having a lesser diameter of the inner surface of the housing and extending substantially through the length of the housing and providing a space between the inner wall of the housing and the outer walls of the drum, the drum having inlet means formed by a deep lip at the periphery of the drum and concentric with the housing inlet means;
   f. Means for rotating the drum; and
   g. Supporting means for the housing.

3. The invention of claim 2 wherein said drum contains at least two (2) integral impeller fan blades.

4. The invention of claim 2 wherein the drum contains a squirrel cage axial flow booster fan.

5. The invention of claim 2 wherein the drum is lined with a filtering media.

6. The invention of claim 5 wherein the filter media comprises a double layer, the inner layer having a substantially smaller pores than the outer layer.

7. The invention of claim 2 wherein the drum inlet has an internal diameter substantially smaller than the housing inlet internal diameter.

8. The invention of claim 2 wherein the drum inlet has an internal diameter substantially smaller than the internal diameter of the filter media lined drum.

9. The invention of claim 2 wherein the slot is about a 1/16 inch gap.

* * * * *